United States Patent [19]

Souissi et al.

[11] Patent Number: 5,671,247

[45] Date of Patent: Sep. 23, 1997

[54] METHOD AND APPARATUS FOR INTERFERENCE SUPPRESSION IN SPREAD SPECTRUM SIGNALS

[75] Inventors: Slim Souissi, Fort Worth; John B. Gehman, Trophy Club, both of Tex.

[73] Assignee: Motorola, Inc., Schaumburg, Ill.

[21] Appl. No.: 547,354

[22] Filed: Oct. 24, 1995

[51] Int. Cl.$^6$ .................. H04B 15/00; H04K 1/00; H04L 27/30
[52] U.S. Cl. .................... 375/200; 375/206; 375/367
[58] Field of Search ............................ 375/200, 206, 375/208, 367; 380/46

[56] References Cited

U.S. PATENT DOCUMENTS

| | | | |
|---|---|---|---|
| 4,882,579 | 11/1989 | Siwiak | 340/825.44 |
| 5,005,014 | 4/1991 | Jasinski | 370/854 |
| 5,029,184 | 7/1991 | Andren et al. | 375/203 |
| 5,263,048 | 11/1993 | Wade | 375/200 |
| 5,335,246 | 8/1994 | Yokev et al. | 375/202 |
| 5,363,401 | 11/1994 | Lucas et al. | 375/201 |
| 5,410,750 | 4/1995 | Cantwell et al. | 375/200 |

OTHER PUBLICATIONS

Milstein, et al., IEEE ISSSTA, Oulu, Finland, Jul. 1994, "Interference Suppression for CDMA Overlays of Narrowband Waveforms", pp. 61–68.

Ketchum, et al., IEEE, vol. Com. 30, No. 5, May 1982, "Adaptive Algorithms for Estimating and Suppressing Narrow-Band Interference in PN Spread–Spectrum Systems", pp. 913–924.

Milstein, et al., IEEE, vol. 76, No. 6, Jun. 1988, "Interference Rejection Techniques in Spread Spectrum Communications", pp. 657–671.

Kohno, et al., IEEE, vol. 8, No. 4, May 1990, "An Adaptive Canceller of Cochannel Interference for Spread–Spectrum Multiple–Access Communication Networks in a Power Line", pp. 691–699.

Kohri, IEEE, 1994, "An Interference Suppressor for CW and Narrow–Band Signals Using Filter Bank on CDMA Communications", pp. 521–525.

Poor et al., IEEE, Third Quarter 1994, "Narrowband Interference Suppression in Spread Spectrum", pp. 14–27.

*Primary Examiner*—Stephen Chin
*Assistant Examiner*—Don Vo
*Attorney, Agent, or Firm*—Pablo Meles

[57] ABSTRACT

Interference removal in spread spectrum signals, comprises the steps at a spread spectrum transmitter (10) of spreading information across a predetermined spectrum by phase modulating a repeating noise sequence (18), providing a spread spectrum signal and transmitting the spread spectrum signal. The method further comprises the steps at a receiver of receiving the spread spectrum signal along with interference (41) multiplying (42) the spread spectrum signal along with interference by a window function (44) providing a multiplied spread spectrum signal. The information is recovered by despreading the multiplied (48) spread spectrum signal using a reciprocal (50) of the spectrum of the repeating noise sequence to obtain a data spectrum with interference and subsequently normalize (52) to obtain a clean data spectrum. Alternatively the information can be recovered by substituting a corrupted magnitude spectrum with a prestored PN sequence magnitude spectrum (70) as shown by receiver (60).

26 Claims, 5 Drawing Sheets

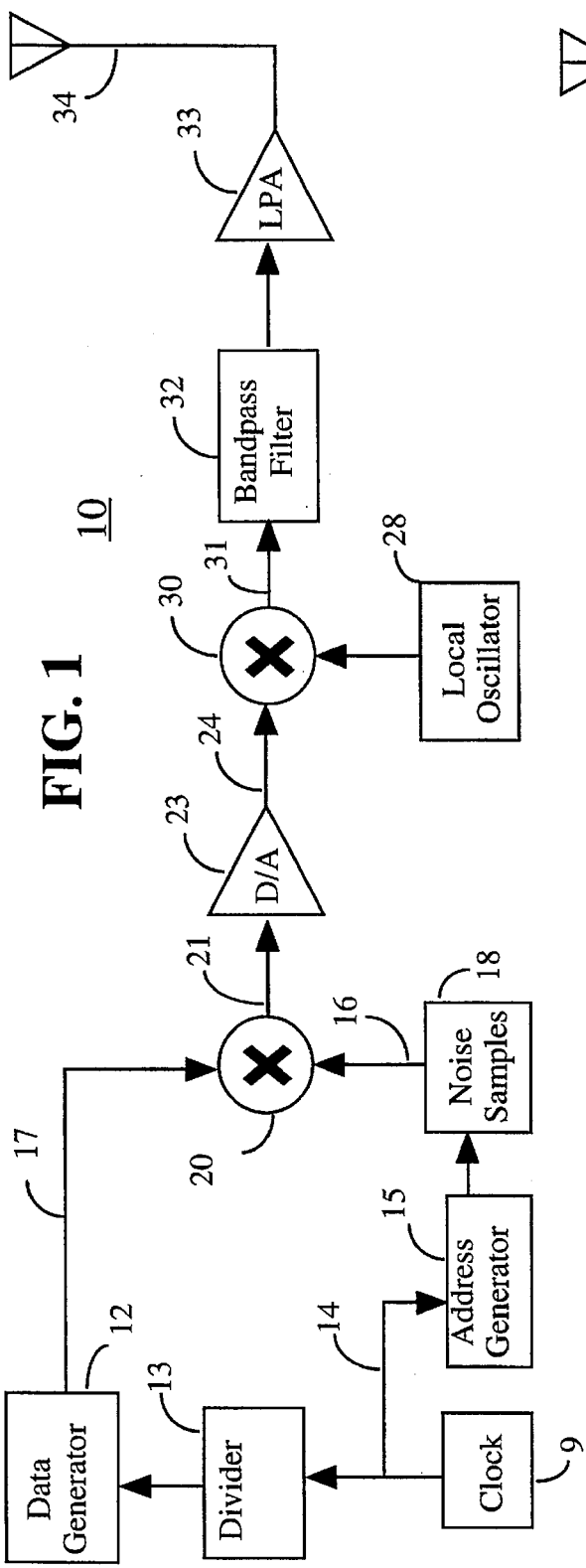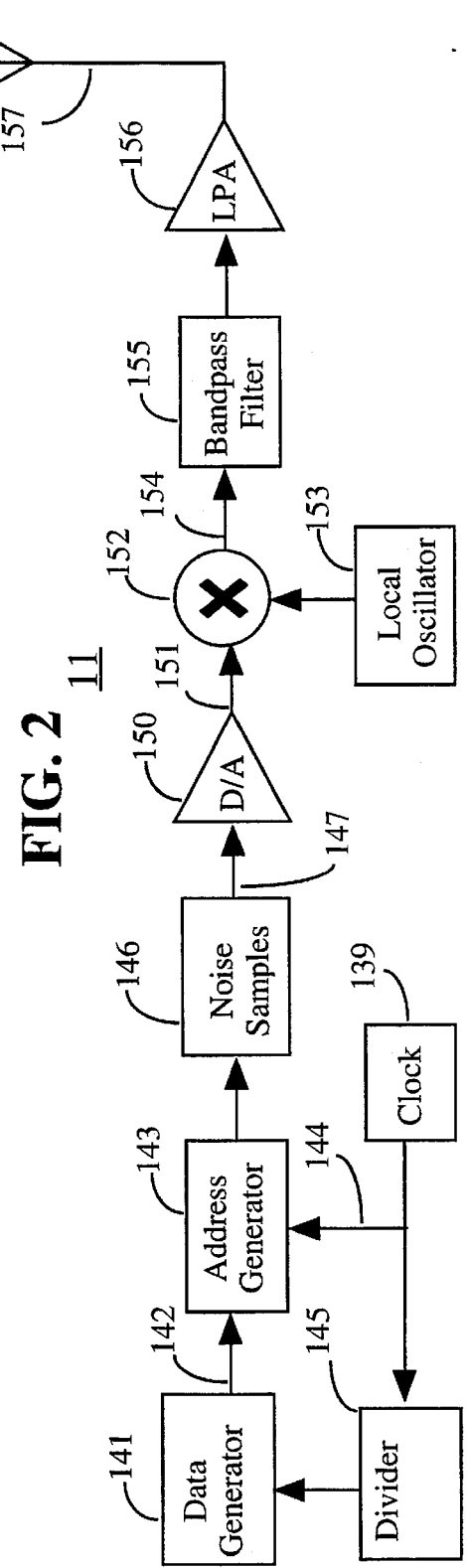

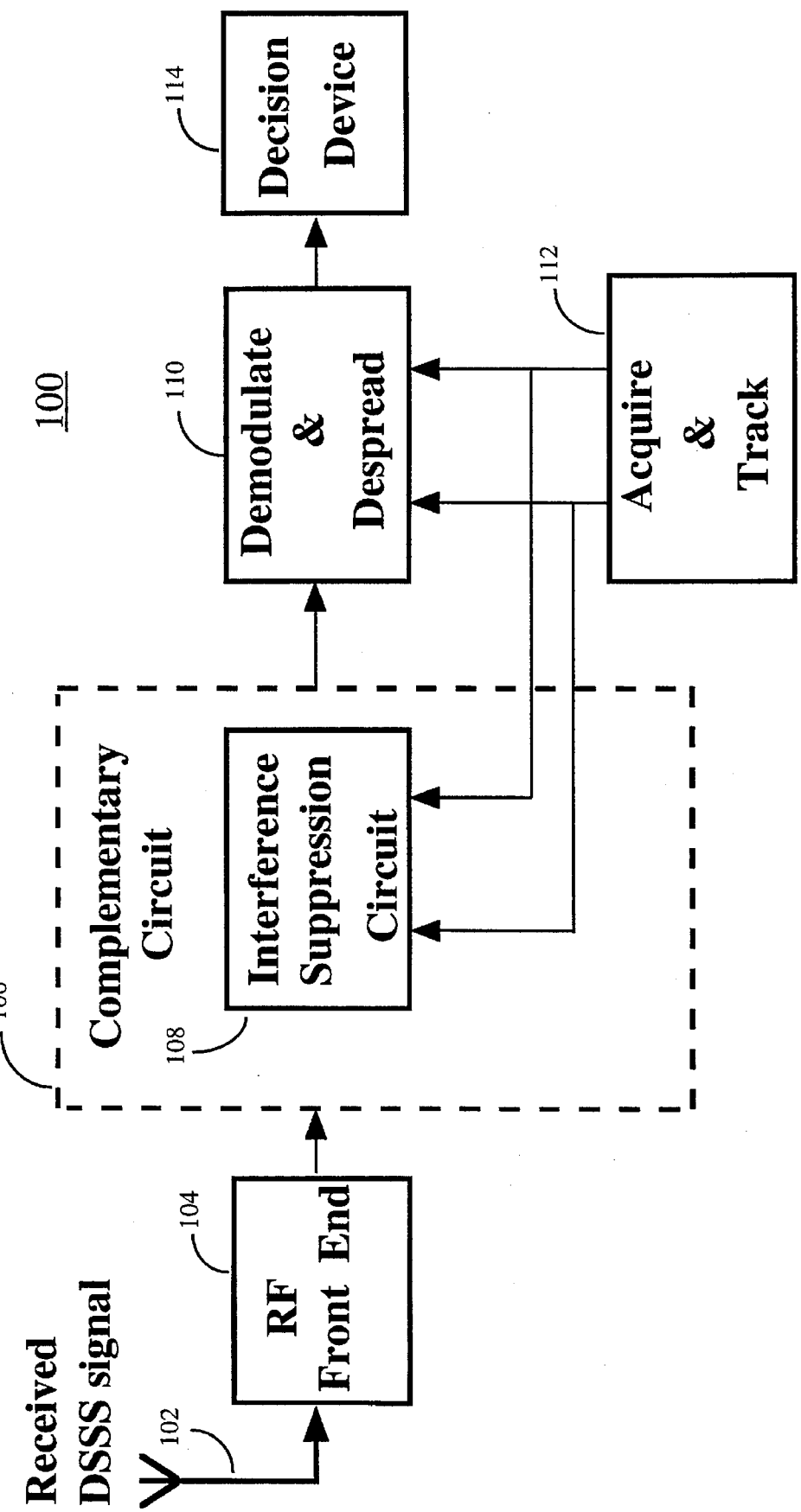

METHOD AND APPARATUS FOR INTERFERENCE SUPPRESSION IN SPREAD SPECTRUM SIGNALS

TECHNICAL FIELD

This invention relates generally to spread spectrum systems and techniques, and more particularly to a method and apparatus for improved information signal recovery by either reconstruction or substitution of the spread spectrum signal to minimize interference.

BACKGROUND

The idea of spread spectrum was first used during World War II to combat intentional jamming and securely exchange information. Spread spectrum systems must meet at least two criteria. First, the transmitted bandwidth should be much greater than the bandwidth or rate of the information being sent, and second, some function other than the information being sent is employed to determine the resulting modulated RF bandwidth. Thus, the essence of spread spectrum communications involves expanding the bandwidth of a signal, transmitting that expanded signal, and recovering the desired signal by remapping the received spread spectrum into the original information bandwidth for the purpose of delivering error-free information in a noisy signal environment. Numerous schemes have been developed to meet these two requirements, but typically excessive interference, including interference from narrow band interferers cripples such systems.

Spread spectrum consists of two different modulation schemes, namely Direct Sequence (DSSS) and Frequency Hopping (FHSS). DSSS modulation uses a high rate code to spread the data over a large bandwidth while FHSS modulation involves rapidly changing the carrier frequency of the narrow band data signal. The present invention particularly applies to DSSS systems, but other applications could be contemplated within the scope of the claims.

Direct sequence spread spectrum modulation is noted for its ability to tolerate narrow band interference by providing processing gain equal to the spread ratio. The spreading factor also called processing gain, is a measure of system immunity to interference noise. The energy from a narrow band jammer is spread over the wide bandwidth of the spread spectrum signal. Only the portion of the noise within the data bandwidth affects the DSSS receiver sensitivity. When dealing with high narrow band interference, the spreading gain is not enough to overcome such high level of noise.

A large part of the work in narrow band interference (NBI) mitigation has been reviewed comprehensively by L. B. Milstein in a paper titled "Interference rejection techniques in spread spectrum communications," Proceedings of the IEEE, vol. 76. No. 6. pp. 657–671. Briefly, most of the efforts have concentrated on two basic types of methods: time domain estimation/notch filtering and frequency domain NBI energy suppression. Time domain methods consists in estimating the narrow band signal and subtracting it from the received signal, thus enhancing the wideband components. The other method of narrow band interference suppression operates in the frequency domain by taking the Fourier transform of the received signal and performing a frequency domain interference removal. One of the most popular techniques for interference removal is applying a mask and attenuating the located NBI signal. Others have suggested excising the interferer. This involves estimating an optimum excision threshold beyond which all the signal energy is removed as taught by T. Kohri in a paper titled "An interference suppressor for CW and narrow-band signals using filter bank on CDMA communications", Proceedings of IEEE ISSSTA '94, vol. 1 pp. 61–68 Oulu, Finland. Other methods involve filters that attempt to adapt to the interference. If the narrow band jammer is frequency hopping then the receiver can not adapt quickly enough to locate the interfering signal and remove it. Most of the previously described work remains at the theoretical stage. Many algorithms have not been implemented in commercial products because of their complexity and lack of efficiency in realistic environments In 1985, the Industrial, Scientific, and Medical (ISM) bands (three unlicensed bands: 902–928 MHz, 2.4–2.4835 GHz, and 5.725–5.870 GHz) were allotted by the FCC for general purpose communication as long as spread spectrum communication is used under part 15 regulations. The FCC decision has had a tremendous impact in the commercial world. Thousands of ISM band devices are now available on the market. Since the spectrum is unlicensed, hundreds of other wireless applications are yet to come. This will cause a dramatic increase in the interference noise level and may cause the collapse of the entire band. The present invention proposes a way to survive in such a noisy environment that further serves as an effective method of interference cancellation.

Among other applications, the present invention can be used in the 800 MHz cellular band where both Code Division Multiple Access (CDMA) and (Advanced Mobile Phone System) AMPS coexists. It has been observed that CDMA cellular phones become completely unreliable when operating in the vicinity of AMPS base stations. AMPS systems transmit narrow band signals which have a power level beyond the interference rejection capabilities of conventional spread spectrum systems. Thus, a need exists for an efficient and cost effective method and apparatus for suppressing interference in spread spectrum signals.

SUMMARY OF THE INVENTION

In a first aspect of the present invention, a method of interference removal from data in spread spectrum signals that have been encoded and transmitted by modulating a repeating noise sequence with data, comprises the steps at a receiver receiving the spread spectrum signal along with interference; converting the spread spectrum signal into the frequency domain providing a received signal with a phase information portion and a magnitude information portion; removing interference from the magnitude information portion by applying a prestored function of the repeating noise sequence to the magnitude information portion; and extracting substantially interference free data from the phase information portion.

In another aspect of the present invention, an interference suppression circuit for suppressing interference on corrupted data encoded in a spread spectrum signal comprises a receiver for receiving the spread spectrum signal; a frequency domain converter for converting the spread spectrum signal from the time domain into the frequency domain and providing a corrupted phase information portion and a corrupted magnitude information portion; an interference suppression circuit for suppressing interference on the corrupted magnitude information portion to provide a corrected magnitude information portion and to further combine the corrected magnitude information portion with the corrupted phase information portion to provide an interference suppressed information signal; and a time domain converter for converting the interference suppressed information signal from the frequency domain into the time domain.

BRIEF DESCRIPTION OF THE DRAWINGS

FIG. 1 is a block diagram of a spread spectrum transmitter using phase shift key modulation in accordance with the present invention.

FIG. 2 is a block diagram of a spread spectrum transmitter using pulse position modulation in accordance with another aspect of the present invention.

FIG. 6 is a block diagram of another spread spectrum receiver in accordance with another embodiment of the present invention.

DETAILED DESCRIPTION OF THE PREFERRED EMBODIMENT

Figure 3:
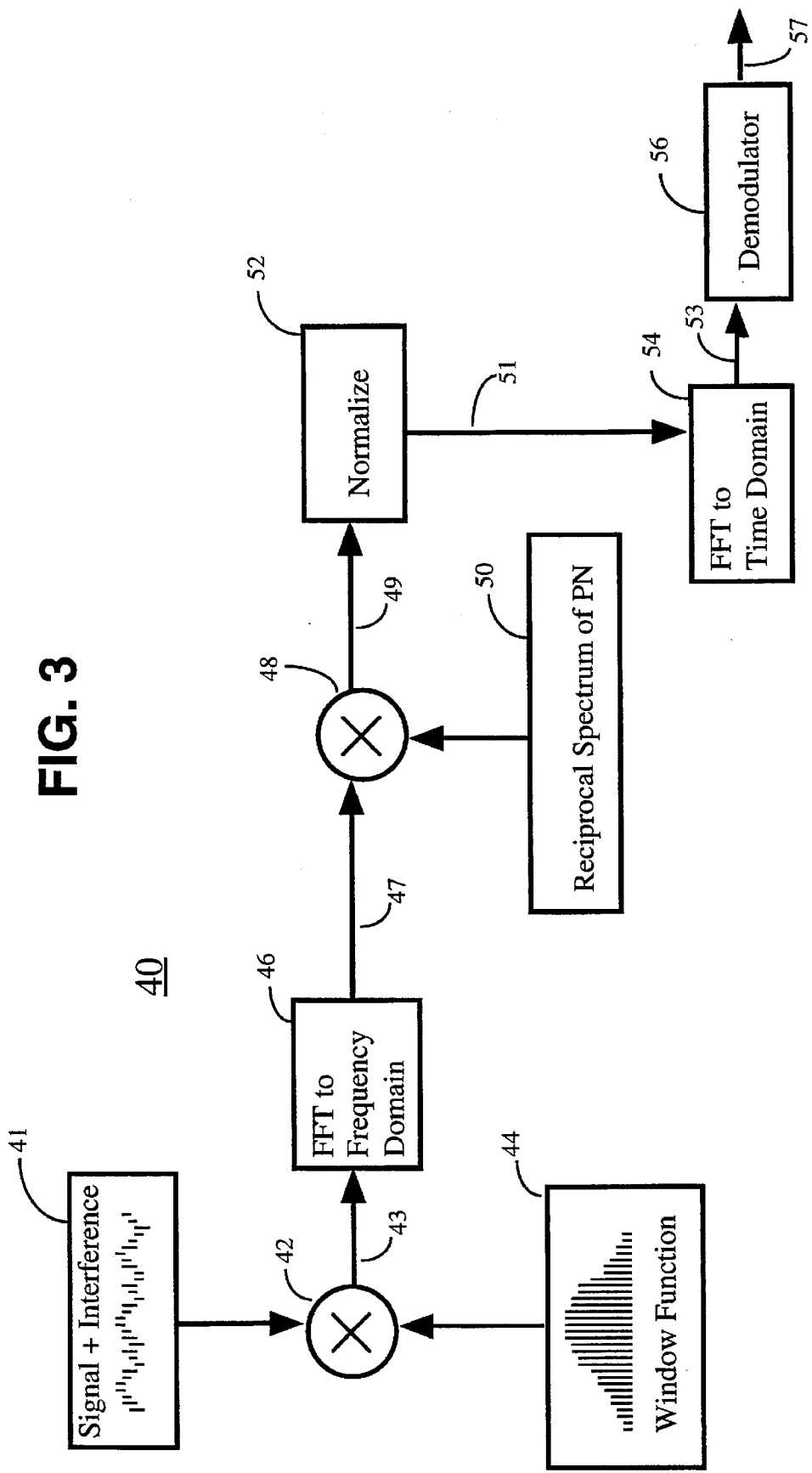
FIG. 3 is a block diagram of a spread spectrum receiver using the reconstruction method in accordance with the present invention.

The present invention improves the sensitivity of spread spectrum receivers (particularly DSSS receivers) by removing narrow band or wideband interference using unique methods of digital signal processing in the frequency domain. The digital signal processing can be performed by a digital signal processor or alternatively by discrete components capable of performing the functions herein described. The method and apparatus for suppressing interference in spread spectrum signals applies to direct sequence spread spectrum signals preferably generated by one of the transmitters shown in FIG. 1 or FIG. 2. The spread spectrum transmitter 10 of FIG. 1 uses phase shift keying modulation. A repeating noise sequence is used to spread information contained in data symbols 17 across a predetermined spectrum at a rate of the chip clock signal 14 derived from the clock generator 9. The data symbol rate is slower than the chip rate since the rate of the chip clock signal 14 is reduced by the spread ratio using divider 13. A data generator 12 formats data into data symbols 17 and outputs the symbols at the data symbol rate. A noise sequence 16 (or noise samples) stored in memory 18 is preferably a binary sequence but may also include complex analog waveforms known as wavelets. The number of noise samples in memory 18 is equal to the spread ratio. During each data symbol all of the noise samples stored in memory 18 are sequentially output at the chip rate by address generator 15 which is set up as a circular buffer. The multiplier 20 multiplies the data symbols 17 by the noise samples 16 which phase modulates the noise samples by the data. The phase modulated noise signal 21 is converted to analog by the digital-to-analog converter 23 to provide a baseband spread data signal 24. The baseband spread data signal 24 is then translated to a higher frequency by mixing it with the carrier from a local oscillator 28 in a mixer 30 providing a mixed signal 31. The mixed signal 31 is filtered by a bandpass filter 32 allowing only the baseband signal to pass. Subsequently the translated and filtered spread data signal is amplified using linear power amplifier 33 and transmitted via antenna 34.

The spread spectrum transmitter of FIG. 2 uses pulse position modulation. A repeating noise sequence contained in data symbols 142 is used to spread information across a predetermined spectrum at the rate of the chip clock signal 144 derived from the clock generator 139. The data symbol rate is slower than the chip rate since the rate of the chip clock signal 144 is reduced by the spread ratio using a divider 145. A data generator 141 formats data into data symbols 142 and outputs the symbols at the data symbol rate. A noise sequence 147 stored in memory 146 is preferably a binary sequence but may also include complex analog waveforms or wavelets as previously mentioned. The number of noise samples in memory 146 is equal to the spread ratio. Data symbols 142 are pulse position modulated by circularly shifting the noise samples 147 out of memory 146 starting at different memory locations as determined by the data symbol 142. Address generator 143 which sets up memory 146 as a circular buffer is preset to different starting memory positions by data symbols 142. The address generator 143 then outputs all of the noise samples 147 in memory 146 starting at the preset memory location. This is equivalent to pulse position modulation. The time shifted noise samples 147 are converted to analog by the digital-to-analog converter 150 providing a baseband spread data signal 151. The baseband spread data signal 151 is then translated to a higher frequency by mixing it at a mixer 152 with the carrier signal from the local oscillator 153 to provide a mixed signal 154. The mixed signal 154 is filtered by a bandpass filter 155 allowing only the baseband signal to pass. Subsequently the baseband signal or spread data signal is amplified using linear power amplifier 156 and transmitted via antenna 157.

The system and method for suppressing interference in spread spectrum signals would preferably comprise the spread spectrum receiver 40 shown in FIG. 3 using a "reconstruction" method as will be further described or the spread spectrum receiver 60 using a "substitution" method as will be described with regard to FIG. 4. Referring to FIG. 3, the receiver 40 receives a spread spectrum signal (with data) along with interference at block 41. This signal is optionally "windowed" by multiplying (42) the spread spectrum signal with a window function 44 to provide a received spread spectrum signal 43 or received signal. The received spread spectrum signal 43 is then converted (preferably using a Fast Fourier Transform (FFT)) at block 46 to the frequency domain, thereby providing a frequency domain signal 47. Then, the frequency domain signal 47 is despread or multiplied at block 48 by a reciprocal of the spectrum of the repeating noise sequence in block 50 to obtain a data spectrum with interference or a despread signal 49. Note that if the received spread spectrum signal and despread code are windowed, the bandwidth of a jammer signal is reduced thus corrupting less of the received spectrum. At block 52, the despread signal 49 is limited in magnitude by preferably hard limiting or normalizing to provide a normalized signal 51 (or a clean data spectrum since most of the essential data information is in the phase in the frequency domain). The normalized signal 51 is then converted back to the time domain using an inverse FFT at block 54 to provide a recovered signal 53. The recovered signal is then demodulated at the demodulator 56 to provide a recovered data signal 57.

As part of the despreading process which is done in the frequency domain, the incoming data is transformed so that its spectrum has a constant magnitude. In other words, multiplying the received signal by the reciprocal of the spread code (PN sequence at transmitter) will provide a spectrum having a constant magnitude. In this manner, interferers are exposed as magnitude variations that can be eliminated by preferably performing a complex normalize. This operation forces the interference to have the same magnitude as the data. All of the information is now in the spectral phase. The interference thus only corrupts small portions of the spectrum.

The despreading signal can be the complex reciprocal of the spectrum of the spread code. The transformation and complex reciprocal operations require a very high number of computations so the waveform is preferably stored in complex memory instead of generating it for every data symbol. Despreading in this embodiment can comprise the pointwise complex multiplication at block 48 of the stored waveform with the spectrum of the received signal. The addition of a window function will further attenuate high power narrow band jammers.

A special case of this process exists where the spectrum of the spreading signal has a flat magnitude. If the magnitude is constant at every point, then so is the reciprocal. If the magnitude is 1 then the reciprocal of the magnitude is 1. This simply means that the reciprocal operation is reduced to only a complex conjugate operation. Constant magnitude spreading signals are desirable because they do not amplify noise or interference during the despreading process.

The implementation shown in FIG. 3 handles the general case of all DSSS waveforms with repeating code sequences.

In one aspect of the present invention as embodied in receiver 40 using the "reconstruction" method, the invention can be broken down inter alia into the serial combination of three algorithms. The first algorithm is applying a window function to reduce the bandwidth of the interference. The next is despreading in the frequency domain such that the spectrum of the data has a constant magnitude. The last algorithm is a complex normalize of the (signal containing data with interference) spectrum which eliminates the interference. The stored despreading waveform reduces the amount of computation required.

Figure 4:
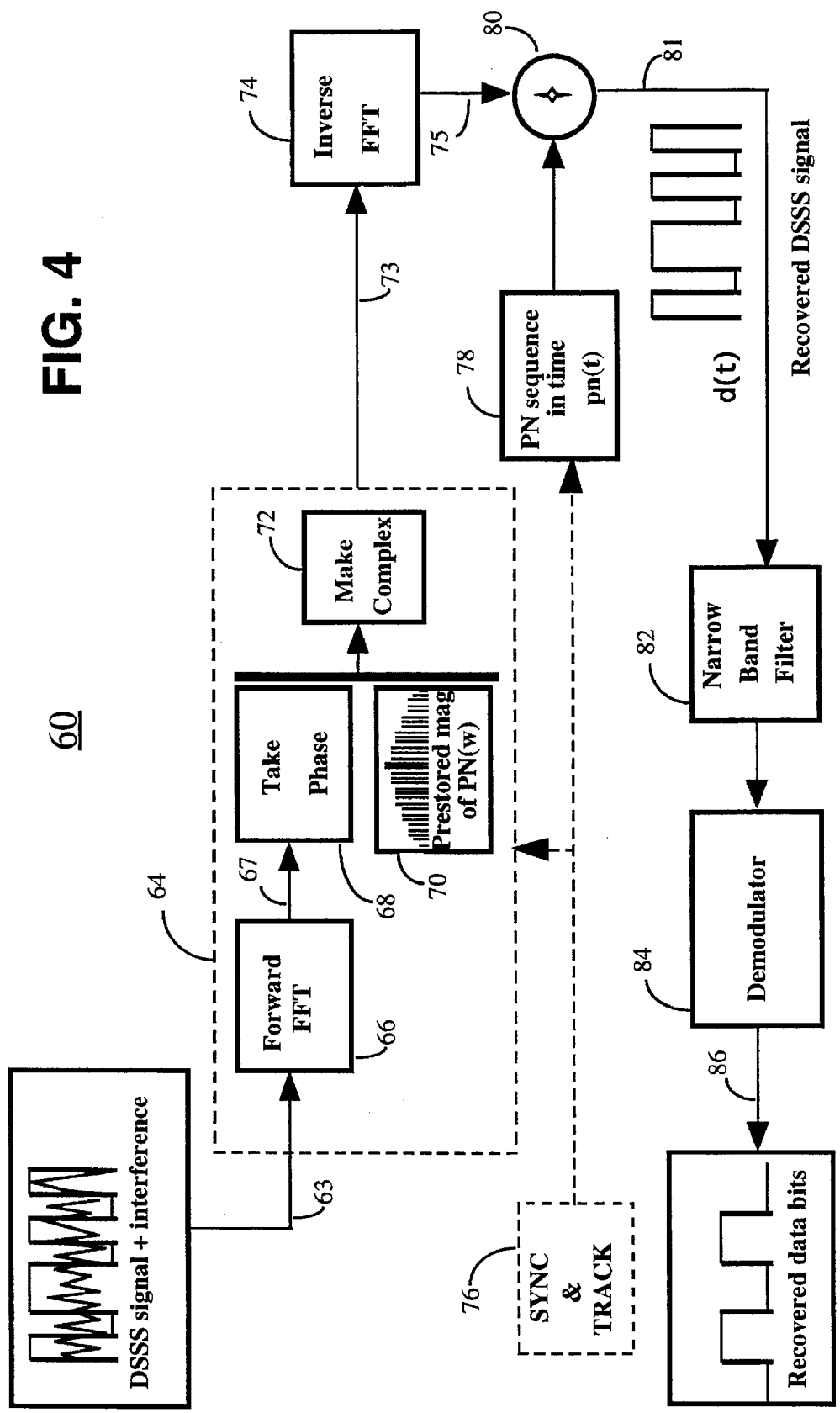
FIG. 4 is a block diagram of a spread spectrum receiver using the substitution method in accordance with the present invention.

Referring to FIG. 4, the receiver 60 receives a spread spectrum signal 63 (with data) corrupted with interference (noted herein as s(t)). As discussed with regard to FIG. 3, this signal can be optionally "windowed" (not shown) to reduce the bandwidth of a jammer thereby corrupting less of the received spectrum. The spread spectrum signal 63 or received signal is then provided to an interference suppression block 64 which performs among other functions, the conversion of the received signal at block 66 to the frequency domain, preferably using a Fast Fourier Transform (FFT). The FFT provides a corrupted data signal 67 (noted herein as S(w)) including a corrupted magnitude spectrum and a corrupted phase spectrum. The interference block 64 at block 68 determines the phase information from the corrupted data signal 67. At block 70, the corrupted magnitude spectrum is substituted with a prestored magnitude spectrum of the repeating noise sequence (noted herein as PN(w)). The corrupted phase spectrum is then combined with the prestored magnitude spectrum of the repeating noise spectrum in blocks 64 and 72 to provide a substantially interference free spread spectrum signal 73 (noted herein as S(w)). At block 74, an inverse FFT is preferably used to convert the substantially interference free spread spectrum signal 73 to a signal 75 (noted herein as s(t)) in the time domain. Synchronizing and tracking at block 76 is required for the interference suppression block 64 and the spread code block 78 to permit synchronized despreading of the substantially interference free spread spectrum signal. Thus, by combining the substantially interference free spread spectrum signal with the spread code in the time domain at block 80, a recovered signal 81 (herein noted as d(t)) allows for substantially interference free data to be extracted from the phase information portion of the received signal at a demodulator 84 preferably after the recovered signal 81 is filtered by a narrow band filter 82. The narrow band filter 82 is preferably implemented to remove bandwidth of little pertinent information content.

The following embodiments represent a practical and efficient method for interference suppression in direct sequence spread spectrum (DSSS) systems and hybrid DS/Frequency Hopped systems. The method performs best when combating narrow band interference and has quite good performance when operating under other interference scenarios such as co-channel interference, wideband interference, and adjacent channel interference. The methods disclosed generally operate by eliminating the effect of the interfering signal on the magnitude of the Fourier transform of the DSSS signal. Such processing is performed in the frequency domain. To further understand how the substitution method operates, the following convention or notation is recapped below:

d(t): Transmitted spread spectrum signal i(t): Interference signal s(t): Transmitted spread spectrum data corrupted with interference s(t): s(t) after interference suppression pn(t): Pseudo-noise spreading code in time domain S(w): Fast Fourier Transform (FFT) of s(t)

PN(w): FFT of pn(t)

S(w): FFT of s(t)

Additionally, a spread spectrum symbol is defined as the product of the PN sequence by an M-ary PSK symbol.

When DSSS is used in conjunction with M-ary Phase Shift Keying modulation (PSK), the spectral magnitudes of all M spread spectrum symbols is identical. Only a phase change occurs each time there is a transition from one symbol to another. The present invention makes use of this property by forcing any received symbol to have the "already known" correct magnitude. Consequently, any source of interference would only affect the phase components of the signal while the magnitude components remain highly reliable. Such a technique is very effective, especially when dealing with high power narrow band interferers.

Figure 5:
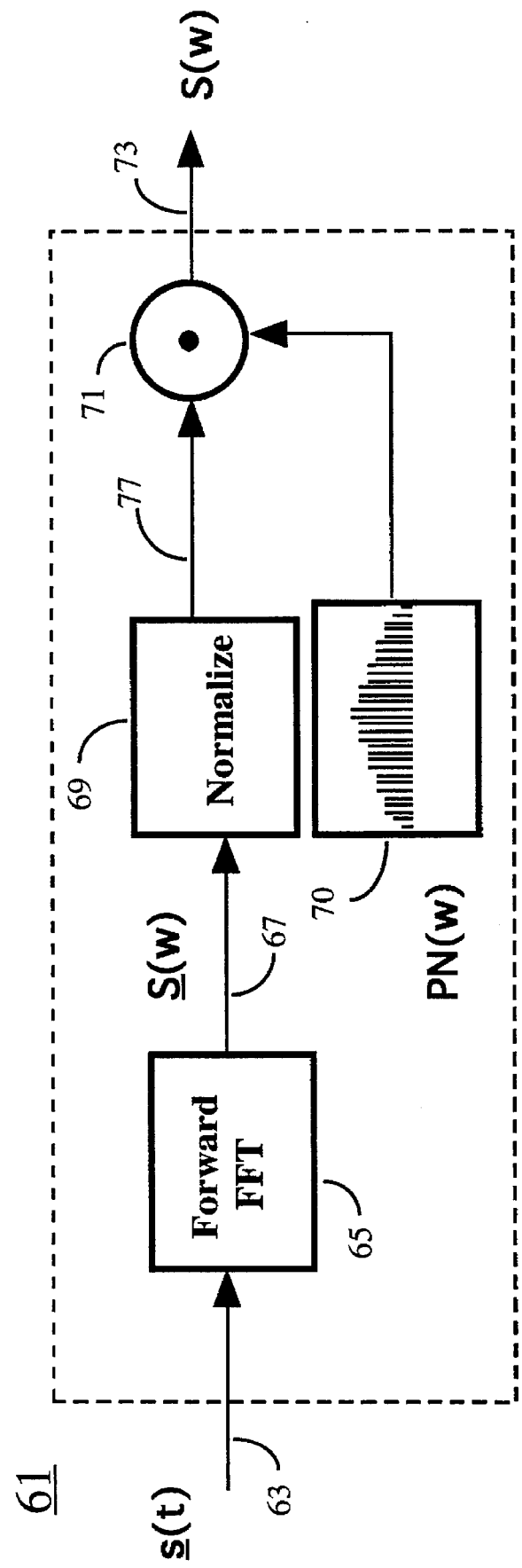
FIG. 5 is a block diagram of a portion of the spread spectrum receiver using the substitution method in accordance with the present invention.

FIG. 5 shows a hardware implementation of an interference suppression block 61 which could substitute for the interference suppression block 64 of FIG. 4 in the case of a receiver capable of demodulating M-ary Phase Shift Key (MPSK) modulation. The corrupted data signal 63, s(t), is passed through a forward Fast Fourier Transform at block 65, resulting in S(W) or a frequency domain signal 67. The magnitude of S(W) is a "$[\sin(x)/x]^2$" shaped function, on top of which are spikes that correspond to the frequency components of the interfering signal. In order to entirely eliminate the interfering components from the corrupted magnitude of the spectrum, a perfect spectrum stored in memory 70 is substituted for the corrupted one. The prestored spectrum is the magnitude of PN(w).

Referring again to FIG. 4, the next step of the suppression algorithm consists in producing a "clean" spread spectrum signal. The procedure consists in taking the phase of S(W) (FFT of the "corrupted" spread spectrum signal) at block 68 and combining it with the prestored magnitude of PN(w) (70) into a complex signal using block 72. This operation results in the signal S(w) (73) which has a correct magnitude but a slightly corrupted phase. Finally, s(t) is recovered by applying an inverse FFT to S(w). Note that, by adding a window in front of every FFT operation it is possible to attenuate the interference further, thus improving the overall performance. For a hardware implementation of block 64 of FIG. 4, phase information is preferably extracted using an ArcTangent device (68). Alternatively, the interference suppression block 64 can be replaced with interference suppression block 61 of FIG. 5 wherein the corrupted spread spectrum signal in the frequency domain S(W) is normalized at block 69 resulting in a complex signal with normalized magnitude (77) which is multiplied (71) by the stored magnitude of PN(w) in memory 70 resulting in a substantially interference free spread spectrum signal 73, S(w).

Once a "clean" spread spectrum signal 73 is produced in the time domain, the rest of the process consists simply in using familiar DSSS detection techniques. That is, the spread spectrum signal is despread, filtered and a decision device is used to recover the transmitted data.

Also implementation of this algorithm requires minor changes in some existing DSSS conventional receivers. FIG. 6 shows that the interference suppression module 106 could be plugged between an RF front end 104 and a despread/demodulate circuit 110 in a DSSS receiver 100 having an antenna 102 for receiving DSSS signals. It should have accurate information about the acquisition and the tracking status of the receiver as evidenced by block 112. This information is used during both acquisition and tracking modes in order to lineup the magnitude and the phase of S(w). As previously explained, the spread spectrum signal is preferably despread (block 110), filtered (not shown) and a decision device or demodulator at block 114 is used to recover the transmitted data.

The algorithms and implementations are based on two primary insights: 1) High power narrowband interference affects the amplitude of the received spectrum more than the phase and 2) The spectral amplitude of M-ary PSK spread spectrum signals is independent of the modulated data.

Given these insights it is possible to substitute the amplitude of the received spectrum in two ways. The two methods provide computational trade-offs that can be implemented in software or specialized hardware. The methods are to either convert the spectrum to polar data, substitute the amplitude and convert back to rectangular data as shown in FIG. 4 or to normalize the signal to unity magnitude and then scale the magnitude to match a template as shown in FIG. 5.

Previous methods were adaptive and required interference identification. The methods disclosed herein provide the performance benefits over known technology including, but not limited to removal of frequency hopped interferers, removal of interferers in a rapidly fading environment, and removal of any number of high power interferers provided the interferer bandwidth does not cover most of the spectrum. It should also be noted that the methods disclosed are primarily directed towards phase modulation implementations, but one ordinarily skilled in the art should understand that "time" modulation can equally be used.

The present invention has been described in detail in connection with the disclosed embodiments. As previously mentioned, the present invention can be implemented in the cellular band where CDMA and AMPS coexist. Further, the receivers and circuits described herein could form a portion of acknowledge back receivers. These embodiments, however, are merely examples and the invention is not restricted thereto. It will be understood by those skilled in the art that variations and modifications can be made within the scope and spirit of the present invention as defined by the appended claims.

What is claimed is:

1. A method of interference removal from data in a spread spectrum signal that has been encoded and transmitted by modulating a repeating noise sequence with the data, comprising the steps of:
   at a receiver:
      receiving the spread spectrum signal along with interference;
      multiplying the spread spectrum signal along with interference by a window function providing a multiplied spread spectrum signal;
      converting the multiplied spread spectrum signal into the frequency domain providing a received signal with a phase information portion and a magnitude information portion;
      removing interference from the magnitude information portion by applying a prestored function of the repeating noise sequence to the magnitude information portion; and extracting substantially interference free data from the phase information portion.

2. A method of interference removal from data in a spread spectrum signal that has been encoded and transmitted by phase modulating a repeating noise sequence with the data, comprising the steps of:
   at a receiver:
      receiving the spread spectrum signal along with interference;
      multiplying the spread spectrum signal along with interference by a window function providing a multiplied spread spectrum signal;
      converting the multiplied spread spectrum signal into the frequency domain providing a received signal;
      multiplying the received signal by a reciprocal of the spectrum of the repeating noise sequence to obtain a data spectrum with interference; and
      normalizing the data spectrum with interference to provide a clean data spectrum.

3. A method of interference removal in spread spectrum signals comprising the steps of:
   at a transmitter:
      modulating information using phase shift keying;
      spreading the information across a predetermined spectrum by phase modulating a repeating noise sequence, providing a spread spectrum signal; and
      transmitting the spread spectrum signal;
   at a receiver:
      receiving the spread spectrum signal along with interference;
      multiplying the spread spectrum signal along with interference by a window function providing a multiplied spread spectrum signal;
      converting the multiplied spread spectrum signal into a frequency domain providing a received signal;
      multiplying the received signal by a reciprocal of the spectrum of the repeating noise sequence to obtain a data spectrum with interference; and
      limiting limiting the magnitude of the data spectrum with interference to provide a clean data spectrum.

4. The method of claim 3, wherein the step of spreading the information includes the step of phase modulating a spectrum with a pseudo-random noise sequence.

5. The method of claim 3, wherein the step of multiplying the received signal further comprises the step of transforming the information within the spread spectrum signal to provide a constant magnitude spectrum.

6. The method of claim 3, wherein the step of multiplying the spread spectrum signal with interference further comprises the step of pointwise scalar multiplying the spread spectrum signal with interference with a bandwidth spectrum limiting window.

7. The method of claim 3, wherein the step of multiplying the received signal further comprises the step of pointwise complex multiplying the received signal with the reciprocal of the magnitude of the spectrum of the repeating noise sequence.

8. The method of claim 3, wherein the step of spreading the information further comprises the step of using a flat spectrum of the repeating noise sequence.

9. The method of claim 8, wherein the step of multiplying the received signal by a reciprocal of the spectrum of the repeating noise sequence is a complex conjugate operation.

10. The method of claim 3, wherein the step of limiting further comprises the step of complex normalizing the data spectrum with interference.

11. The method of claim 3, wherein the method further comprises the step of converting the clean data spectrum to the time domain.

12. A method of interference removal in spread spectrum signals, comprising the steps of:
at a transmitter:
spreading information across a predetermined spectrum by phase modulating a repeating noise sequence, providing a spread spectrum signal;
transmitting the spread spectrum signal;
at a receiver:
receiving the spread spectrum signal along with interference;
multiplying the spread spectrum signal along with interference by a window function providing a multiplied spread spectrum signal;
despreading the multiplied spread spectrum signal using a reciprocal of the spectrum of the repeating noise sequence to obtain a data spectrum with interference; and
complex normalizing the data spectrum with interference to obtain a clean data spectrum.

13. The method of claim 12, wherein the step of spreading comprises the step of phase modulating a pseudo-random noise sequence having a flat magnitude spectrum.

14. The method of claim 12, wherein the method further comprises the step of converting the multiplied spread spectrum signal into a frequency domain to provide a received signal.

15. The method of claim 14, wherein the step of despreading the multiplied spread spectrum signal further comprises the step of pointwise complex multiplying the received signal with the reciprocal of the spectrum of the repeating noise sequence.

16. A method of interference removal in spread spectrum signals, comprising the steps of:
at a transmitter:
spreading information across a predetermined spectrum by phase modulating a repeating noise sequence with the information, providing a spread spectrum signal;
transmitting the spread spectrum signal;
at a receiver:
receiving the spread spectrum signal along with interference;
multiplying the spread spectrum signal along with interference by a window function providing a multiplied spread spectrum signal;
transforming the multiplied spread spectrum signal into a frequency domain, providing a corrupted data signal spectrum including a corrupted magnitude spectrum and a corrupted phase spectrum;
substituting the corrupted magnitude spectrum with a prestored magnitude spectrum of the repeating noise sequence in the frequency domain; and
combining the corrupted phase spectrum with the prestored magnitude spectrum of the repeating noise sequence providing a substantially interference free spread spectrum signal in the frequency domain.

17. The method of claim 16, wherein the method further comprises the step of transforming the substantially interference free spread spectrum signal into a time domain.

18. The method of claim 17, wherein the method further comprises the step of despreading the substantially interference free spread spectrum signal.

19. An interference suppression circuit for suppressing interference on corrupted data encoded in a spread spectrum signal, comprising:
a receiver for receiving the spread spectrum signal along with interference;
a multiplier for multiplying the spread spectrum signal along with interference by a window function providing a multiplied spread spectrum signal;
a frequency domain converter for converting the multiplied spread spectrum signal from a time domain into a frequency domain and providing a corrupted phase information portion and a corrupted magnitude information portion;
an interference suppression module for suppressing interference on the corrupted magnitude information portion to provide a corrected magnitude information portion and to further combine the corrected magnitude information portion with the corrupted phase information portion to provide an interference suppressed information signal; and
a time domain converter for converting the interference suppressed information signal from the frequency domain into the time domain.

20. The receiver of claim 19, wherein the spread spectrum signal is a direct sequence spread spectrum signal.

21. The interference suppression circuit of claim 19, wherein the interference suppression circuit forms a portion of an acknowledge back receiver.

22. A receiver for receiving and decoding corrupted data encoded in a direct sequence spread spectrum signal, comprising:
a receiver module for receiving the spread spectrum signal along with interference;
a multiplier for multiplying the spread spectrum signal along with interference by a window function providing a multiplied spread spectrum signal;
a frequency domain converter for converting the multiplied spread spectrum signal from a time domain into a frequency domain and providing a corrupted phase information portion and a corrupted magnitude information portion;
an interference suppression circuit for suppressing interference on the corrupted magnitude information portion to provide a suppressed magnitude information portion and to further combine the suppressed magnitude information portion with the corrupted phase information portion to provide an interference suppressed information signal; and
a time domain converter for converting the interference suppressed information signal from the frequency domain into the time domain.

23. A spread spectrum system for transmitting, receiving and decoding corrupted data encoded in a direct sequence spread spectrum signal, comprising:

a transmitter for transmitting the spread spectrum signal;

a receiver for receiving the spread spectrum signal along with interference;

a multiplier for multiplying the spread spectrum signal along with interference by a window function providing a multiplied spread spectrum signal;

a frequency domain converter for converting the multiplied spread spectrum signal from the time domain into the frequency domain and providing a corrupted phase information portion and a corrupted magnitude information portion; and an interference suppression circuit for suppressing interference on the corrupted magnitude information portion to provide a suppressed magnitude information portion and to further combine the suppressed magnitude information portion with the corrupted phase information portion to provide an interference suppressed information signal.

24. A receiver for receiving and decoding corrupted data encoded in a direct sequence spread spectrum signal, comprising:

a receiver module for receiving the spread spectrum signal along with interference;

a multiplier for multiplying the spread spectrum signal along with interference by a window function providing a multiplied spread spectrum signal;

a frequency domain converter for converting the multiplied spread spectrum signal from a time domain to a frequency domain providing a corrupted frequency domain spread spectrum signal;

a memory device for storing a reciprocal of repeating noise spectrum;

a multiplier for despreading the corrupted frequency domain spread spectrum signal to provide a despread signal; and a normalizer for limiting the magnitude of a spectrum of the despread signal to provide a normalized signal.

25. The receiver of claim 24 wherein the receiver further comprises a time domain converter for converting the normalized signal from the frequency domain to the time domain providing a recovered signal.

26. The receiver of claim 25 wherein the receiver further comprises a demodulator for demodulating the recovered signal.

* * * * *